US008996210B2

(12) United States Patent
Kish et al.

(10) Patent No.: US 8,996,210 B2
(45) Date of Patent: Mar. 31, 2015

(54) INTEGRATED VESSEL MONITORING AND CONTROL SYSTEM

(75) Inventors: Loretta Kish, Melbourne, FL (US); Lamar McBryde, Palm Bay, FL (US)

(73) Assignee: Sea-Watch Technologies, Inc., Melbourne, FL (US)

( * ) Notice: Subject to any disclaimer, the term of this patent is extended or adjusted under 35 U.S.C. 154(b) by 1811 days.

(21) Appl. No.: 12/016,110

(22) Filed: Jan. 17, 2008

(65) Prior Publication Data

US 2009/0187297 A1   Jul. 23, 2009

(51) Int. Cl.
| B60L 3/00 | (2006.01) |
| B60L 15/00 | (2006.01) |
| G05D 1/00 | (2006.01) |
| G05D 3/00 | (2006.01) |
| G06F 7/00 | (2006.01) |
| G06F 17/00 | (2006.01) |
| G05B 23/02 | (2006.01) |

(52) U.S. Cl.
CPC ........ *G05B 23/0213* (2013.01); *G05B 2219/13* (2013.01)
USPC .......... 701/21; 701/29.1; 701/29.2; 701/31.5; 701/32.3; 701/32.4

(58) Field of Classification Search
USPC .............................................. 701/21, 29–35
See application file for complete search history.

(56) References Cited

U.S. PATENT DOCUMENTS

| 4,843,575 | A | * | 6/1989 | Crane | 701/99 |
| 5,933,110 | A | * | 8/1999 | Tang et al. | 342/357.11 |
| 6,456,941 | B1 | * | 9/2002 | Gutierrez | 701/301 |
| 6,522,265 | B1 | * | 2/2003 | Hillman et al. | 340/988 |
| 6,549,130 | B1 | * | 4/2003 | Joao | 340/539.14 |
| 6,687,583 | B1 |   | 2/2004 | Knoska |  |
| 6,798,343 | B2 | * | 9/2004 | Carrier et al. | 340/539.13 |
| 6,933,884 | B2 | * | 8/2005 | Martin et al. | 342/357.07 |
| 6,978,197 | B2 |   | 12/2005 | Knoska |  |
| 7,327,286 | B2 |   | 2/2008 | Knoska |  |
| 7,505,836 | B2 | * | 3/2009 | Okuyama et al. | 701/21 |
| RE41,173 | E | * | 3/2010 | Baggs | 340/853.7 |
| 2002/0022984 | A1 | * | 2/2002 | Daniel et al. | 705/8 |
| 2003/0214417 | A1 | * | 11/2003 | Peltz et al. | 340/825 |

* cited by examiner

*Primary Examiner* — Rami Khatib
(74) *Attorney, Agent, or Firm* — John L. DeAngelis; Beusse Wolter Sanks & Maire, P.A.

(57) ABSTRACT

A vessel monitoring and control system. Data indicative of operational conditions for vessel systems is transmitted from the vessel to one or more remote sites and commands are received from the one or more remote sites for controlling the vessel systems. Multiple transmitting and receiving components are available on the vessel for communicating with a variety of different communications systems at the remote sites.

31 Claims, 2 Drawing Sheets

US 8,996,210 B2

INTEGRATED VESSEL MONITORING AND CONTROL SYSTEM

This application claims the benefit of application Ser. No. 11/124,961 filed on May 9, 2005, which claims the benefit of application Ser. No. 10/460,062 filed on Jun. 12, 2003 (now U.S. Pat. No. 6,904,341), which further claims the benefit of the provisional patent application assigned No. 60/388,572 filed on Jun. 12, 2002.

FIELD OF THE INVENTION

The present invention relates generally to monitoring and control systems, and more specifically to monitoring and control systems for a marine vessel.

BACKGROUND OF THE INVENTION

Aside from the simplest unpowered watercrafts, most marine vessels comprise a plurality of systems for operating and propelling the vessel, as well as additional systems for providing a comfortable environment for the passengers. The control and monitoring of the various systems is critical to the safe, efficient and comfortable operation of the vessel. Additionally, while docked and unattended, the vessel must be secured against unwanted intruders and protected from system failures that can lead to expensive losses, especially since most marine vessels are docked and left unattended for substantial periods. Accordingly, it is critical to monitor the various system conditions during operation and while the vessel is docked.

All powered marine vessels include a plurality of devices for monitoring (sensing) and controlling various vessel systems. Exemplary sensing devices providing operational parametric information to the vessel operator include the speedometer, tachometer, depth finder, and various pressure and temperature sensors. Output control signals are required to operate the vessel propulsion and navigation systems, for example. An engine control unit provides signals for controlling the vessel engine and the propulsion system, in response to commands supplied by the vessel operator or provided by automatic control mechanisms.

A system failure while the vessel is unattended will likely not be detected for an extended period, i.e., until the operator's next visit. Failure of the bilge pump system, for example, can result in substantial damage when the vessel is unattended. The bilge pump system maintains the boat level within a body of water, and includes a pump, power source, and sensor for determining the water level. In the event of a power source, sensor or pump failure, the resultant high water level in the bilge can cause substantial vessel damage.

It is known that the monitoring and controlling of vessel systems is conventionally undertaken by independent monitoring and control systems aboard the vessel. That is, operational conditions detected by a sensor associated with one system may not be considered in conjunction with the operation of another system. Disadvantageously, consideration of the operational information for both systems could result in improved vessel operation or could point to an actual or incipient failure of either system.

In addition to the lack of coordinated consideration of system conditions, these independent systems require a substantial number of wires and interconnection points to connect the sensors, transducers, and operative devices to their associated components. The integration of these systems into the vessel as it is being manufactured is considered a relatively complex undertaking, especially given the large number of interconnects and the multiple lengthy conductor runs. Maintenance of these systems and their interconnects can also be unduly complex. After the vessel is in service, integration of one or more additional systems to the existing vessel systems can also be a complex process, with respect to making the physical connections between the various components of the new system and mechanically and electrically integrating the new system into the existing vessel systems.

BRIEF SUMMARY OF THE INVENTION

A vessel monitoring system for monitoring a plurality of vessel operating systems and for communicating with a plurality of remote sites employing various communications techniques. The vessel monitoring system comprising a processor and a plurality of sensors for monitoring the plurality of vessel operating systems. A plurality of communications components selectively communicate with at least one of the plurality of remote sites. The selected communications component from the plurality of communications components employs a communications technique compatible with the communications technique of the one of the plurality of remote sites. The invention further comprises a method for monitoring operating systems of a marine vessel, comprising producing signals indicative of the status of the operating systems and determining a remote site for receiving the signals. Also the method determines a transmitting device for transmitting the signals to the remote site, wherein a communications system employed by the determined transmitting device is compatible with a communications system operative at the remote site.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasis instead being placed upon illustrating the principles of the invention.

DETAILED DESCRIPTION OF THE INVENTION

Figure 1:
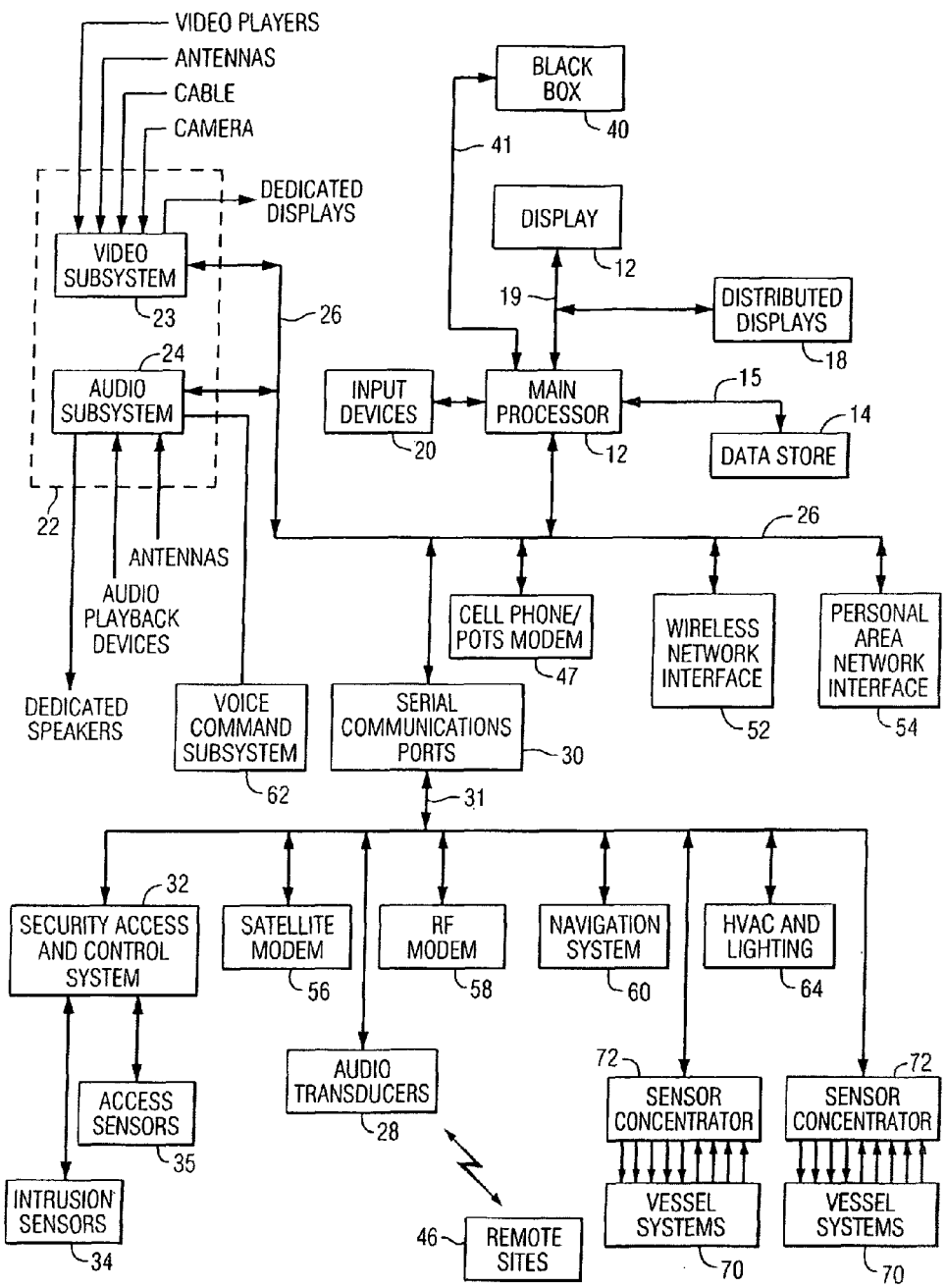
FIG. 1 is a block diagram of an integrated vessel monitoring and control system according to the teachings of the present invention.

Before describing in detail the particular monitoring and control system in accordance with the present invention, it should be observed that the present invention resides primarily in a novel and non-obvious combination of elements and process steps. Accordingly, the elements and steps have been represented by conventional elements and steps in the drawings, showing only those specific details that are pertinent to the present invention so as not to obscure the disclosure with structural details that will be readily apparent to those skilled in the art having the benefit of the description herein.

The integrated monitoring and control system of the present invention comprises an expandable microprocessor-controlled or computer-controlled system that integrates a plurality of the marine vessel systems to improve the monitoring and control functions necessary for safe and efficient vessel operation. The monitoring and control system operates as a hub for bi-directional communications with vessel systems over one or more communications buses. Additionally, the monitoring and control system controls off-vessel wire-based (for use while the vessel is docked) and wireless communications components, employing diverse communications methodologies and protocols (e.g., cellular, frequency modulation, local area networks, satellite). The system of the present invention also offers entertainment functions and includes a vessel "black box" for storing operational data collected by a plurality of sensors. Although described herein with reference to a single vessel, the teachings of the present invention are advantageously applicable to a fleet of vessels, offering simultaneous or independent monitoring and control functionality for the entire fleet.

FIG. 1 is a block diagram of an integrated vessel monitoring and control system 10 constructed according to the teachings of the present invention. A main processor 12 provides data processing and software execution functions for the monitoring and control system 10. In certain embodiments, other components of the system 10 also provide data processing and software execution functionality, as will be described below. In a preferred embodiment, the main processor 12 comprises any of the known microprocessor devices (for example, an X86, Pentium, or Celeron processor manufactured by Intel Corporation of Santa Clara, Calif.). Another microprocessor device, controller or microcontroller capable of processing the data and software routines associated with the present invention can also serve as the main processor 12. In one embodiment the main processor 12 provides Windows-based functionality (Windows is a trademark of Microsoft Corporation of Redmond, Wash.) although a plurality of other operating systems could also be used such as LINUX. Additionally, although not illustrated in FIG. 1, the main processor 12 includes the necessary associated devices, for example, non-volatile and volatile memory, a graphics processor, an audio processor, device drivers, and bus protocol interfaces.

In addition to operating in conjunction with the monitoring and control system 10, the main processor 12 can function as a general purpose computer for executing software programs unrelated to its control and monitoring functions, such as navigation and weather analysis programs and software games.

The main processor 12 communicates with a plurality of vessel systems over one or more communications buses to be described further herein below, receiving operational data from the plurality of vessel systems (as will be described further herein below) for processing, including filtering, manipulation and analysis (e.g., for determining various statistical measures). In response to the results of the data processing operation, the main processor 12 produces control signals provided as control inputs to the vessel systems over the one or more communications buses. Additionally, the main processor 12 communicates operational information to various remote sites employing one or more of a plurality of communications devices via an appropriate communications channel and receives information and commands from the remote sites.

In communicating with the remote sites, the main processor determines which of the available communication devices can close a communications link with the receiving site and thus provide a reliable communications channel. Available communications system options, depend on, for example, the location of the vessel, e.g., docked, near the shore line or several miles from land in the ocean, the nature of the information to be communicated, e.g., routine operational data or an emergency notification and the cost of the available communications channels.

The data processing functions and resultant control signals generated as a result thereof by the main processor 12 are controllable by user-modifiable software routines executed by the main processor 12. Thus the vessel operator/owner, manufacturer or systems integrator (collectively referred to herein as the vessel user) programs the main processor 12 to perform the desired functions. For example, the user can program the main processor 12 to statistically analyze the operational data collected over a prescribed time interval to identify trends that may indicate an incipient system fault. When a user suspects a possible fault in a vessel system, the user can program the main processor 12 to collect and analyze additional operational data from that system or collect the data more frequently.

A data store 14 (including, for example, volatile random access memory, flash memory and non-volatile mass storage) provides additional storage and memory capacity for the main processor 12. A bus 15, comprising, for example a Firewire (IEEE (Institute of Electrical and Electronics Engineers) standard 1394), an IDE (Integrated Drive Electronics), a serial ATA and/or a FibreChannel protocol bus connects the main processor 12 and the data store 14. In another embodiment, a RAID (redundant array of independent disks), essentially a redundant hard disk, offers redundant storage capacity for software routines and the collected operational data.

Under control of the main processor 12, a display or monitor 16, which comprises one element of a human machine interface for the integrated vessel monitoring and control system 10, allows the user to view information regarding the integrated vessel monitoring and control system 10 and the monitored and controlled systems. Other components of the human machine interface, to be described below, provide the user the ability to control operation of the main processor 12, including controlling the information to be displayed. Both raw data and data analysis results are displayable. In one embodiment, a digital dashboard is displayable to indicate the status of vessel systems and components.

Additional displays or monitors, identified in FIG. 1 as distributed displays 18, are positioned at various locations on the vessel, allowing the user to view operational information at sites away from the location of the display 16.

The main processor 12 interfaces with the display 16 and the distributed displays 18 over a video bus 19, comprising, for example, buses operating under one or more of the following bus protocols, DVI, VGA, USB, Firewire, and wired and wireless Ethernet. The main processor 12 includes both hardware and software components, as known in the art, for controlling the display 16 and the distributed displays 18. In an embodiment comprising multiple distributed displays 18, in lieu of providing a bus connection to each display, the video signals are provided via an on-vessel wireless network, to be described below. Each display receives and converts the video signal into the display format. Additionally, it is contemplated according to one embodiment of the present invention, to outfit a vessel with an Ethernet bus to which the various vessel components, including the components of the integrated monitoring and control system 10, can be connected. In such an embodiment the distributed displays 18 are connected to and receive the video signals form the Ethernet bus. As in the wireless embodiment, each display converts the Ethernet-based video signal to the appropriate display format.

The displays operate primarily as output devices, however, in one embodiment the display 16 and the distributed displays 18 further comprise tactile touch screen input elements, allowing the user to provide instructions to the main processor 12 to control the displayed information and operation of the main processor 12.

Input devices 20 comprise another element of the human machine interface, and include one or more of the following components: tactile input devices (such as a keyboard, keypad, or mouse), and a microphone for use in conjunction with a voice recognition system operative with the main processor 12. The input devices 20 are advantageously situated at various locations on the vessel for user convenience in controlling the vessel systems through commands issued to the main processor 12.

In yet another embodiment, a second main processor (not shown) provides redundant capabilities in the event the main processor 12 fails. Since the monitoring and control system 10 determines the occurrence of various emergency conditions aboard the vessel, redundant components significantly increase the probability that emergencies will be detected and appropriate alarms and notifications provided. Advantageously, in another embodiment the integrated monitoring and control system 10 includes a redundant or back-up display and data store.

An entertainment system 22 is responsive to a plurality of program source devices for providing entertainment programs to the vessel occupants. The entertainment system 22 comprises a video subsystem 23 and an audio subsystem 24. The video subsystem 23 accepts video input signals from the following exemplary program entertainment devices: a digital video disc player, a video cassette player, an antenna responsive to terrestrial broadcast television and radio program signals, a satellite antenna and receiver responsive to satellite television signals, a still camera, and a camcorder. A connection to a cable television signal is available when the vessel is docked. The video signals are carried over a bus 26 for input to the main processor 12 and output therefrom to the display 16 or the distributed displays 18. In one embodiment the displays 16 and the distributed displays 18 are capable of displaying standard and high-definition television signals. Generally the bus 26 comprises a high-speed bus for carrying the data-intensive video signals. Although only one bus 26 is illustrated, those skilled in the art recognize that multiple busses can also be employed in other embodiments.

The main processor 12 controls the video subsystem 23 via the bus 26 in response to user commands supplied from the input devices 20 or in response to pre-programmed control functionality. For example, if the user desires to display a received television program on two of the distributed displays 18, under control of user-input commands, the main processor 12 performs the required signal splitting (taking one input and sending it to multiple outputs) function. In another embodiment, the video subsystem 23 can be made to operate independently of the main processor 12 to receive video input signals and display video output signals on dedicated monitors or displays, without requiring signal processing by the main processor 12.

The audio subsystem 24 receives radio signals from terrestrial and satellite broadcasts (e.g., satellite radio) via appropriate receiving antennas and audio inputs from audio playback devices. The received audio signals are input to the main processor 12 via the bus 26. The main processor 12 provides audio signals to audio transducers (e.g., loudspeakers) 28 situated at multiple locations throughout the vessel.

In one embodiment the audio subsystem is self-contained in that intervention of the main processor 12 is not required, as the audio subsystem 24 includes the necessary components for receiving and processing the audio signals, providing audio output signals to dedicated speakers as indicated.

The audio subsystem may further include an intercom with microphones and associated speakers located throughout the vessel. For convenience, the audio transducers 28 and the microphones operative as input devices 20 can also provide the intercom function.

In various embodiments of the integrated monitoring and control system 10, the bus 26 comprises a bus operating according to one of the following known bus protocols and physical embodiments: ISA, PCI, PCIX, PCMCIA, Hypertransport, and VME. Although the exemplary buses are parallel data buses, as is known in the art certain serial bus technologies can also be employed to provide the communications link of the bus 26.

In a preferred embodiment the main processor 12 is easily customized and upgraded to modify the operation thereof and thus modify operation of the integrated monitoring and control system 10. For example, the main processor 12 can include one or more of the many known bus technologies that are easily extendable to accommodate additional processors and devices operating in conjunction with the main processor 12. Such bus technologies include: VME, CPCI, stackable technologies (such as PC 104), Ethernet, PCMCIA, PCI, PCIX, Hypertransport or any of the many known back plane configurations. The main processor 12 further comprises a plurality of interface modules for interfacing with the various systems of the monitoring and control system 10. The nature of such interfaces, which are known in the art, depends on the functionality and characteristics of the interfaced system.

The main processor 12 bi-directionally communicates over the bus 26 with one or more serial communication ports 30 (only one shown in FIG. 1) for providing a signal path over a bus 31 (although only one bus 31 is shown, multiple such busses can also be utilized) to multiple components, as described below, of the integrated monitoring and control system 10. Exemplary technologies for the bus 31 comprise: Ethernet, Firewire, CAN (Controller Area Network), RS 232, 422 and 485. Also, in certain embodiments of the present invention the bus 31 comprises several different serial bus technologies supported by the serial communication ports 30. In yet another embodiment, devices illustrated as connected to one of the buses 26 or 31 can be connected to the other bus with the use of suitable interfacing hardware and software. Thus the configuration shown in FIG. 1 is merely one configuration for the various devices of the integrated monitoring and control system 10 and the vessel components with which it communicates. Other configurations, for example, can employ multiple diverse serial communications buses, depending on the hardware (and software) communications components available for connection to the buses, and further considering the cost, the ease of integration, the required data rate, and the anticipated quantity of data to be carried by the communications components.

Via the buses 26 and 31 and the serial communication ports 30, the main processor 12 communicates bi-directionally with a security and access control system 32 responsive to intrusion sensors 34 distributed throughout the vessel for detecting the presence of unwanted individuals on the vessel or in the vicinity of the vessel. The intrusion sensors 34 comprise, for example, video cameras, still cameras, motion sensors and infrared sensors for providing the intrusion detection capability. The user can remotely control the various intrusion sensors 34 by providing appropriate commands to the main processor 12, via the communications components described below.

The security and access control system 32 also comprises access control components. An individual gains access to the vessel only after providing unique identifying information to one of a plurality of access control sensors 35. The security and access control system 32 or the main processor 12 receive the supplied identifying information from one of the access sensors 35 for determining whether the individual is permitted aboard. The identifying information is processed by comparison with a database of authorized-user identification information, which can be provided in the form of a password, magnetic strip swipe card, fingerprints, or retinal scans. Once an individual is identified as an authorized vessel user, the security and access control system 32 permits vessel entry by unlocking access paths onto the vessel and into its various compartments. Thus the integrated monitoring and control system 10 implements a keyless entry process for the vessel.

A black box 40, a separate hardened storage environment, stores historical operational information, including data collected from the various sensors of the integrated monitoring and control system 10, including the intrusion sensors 34, the access sensors 35 and the operational data sensors described below. Typically, the information is stored for a limited period then over-written at a time when the historical information is no longer deemed relevant. Analysis of the information stored in the black box 40 can be helpful to determine the cause of a vessel accident or incident. The main processor 12 inputs information to the black box 40 over a bus 41 (for example, a Firewire, Ethernet, USB, or other bus) under control of a software routine and/or commands input by the vessel user. Also, the main processor 12 is programmable to control the information storage duration in the black box 40.

The integrated monitoring and control system 10 provides multiple bi-directional communications paths for on-vessel and off-vessel communications during operation of the vessel and while the vessel is docked. A remote site 46 is representative of various remote sites that receive signals from and send signals to the communications components of the integrated monitoring and control system 10. The remote site 46 includes, for example, wired sites and wireless sites, further including Internet sites. Given the multiple available communications schemes, and the cost differential associated with sending and receiving data over the various communications paths, the main processor 12 selects an operative communications system based on the nature of the data to be communicated, the cost effectiveness of each of the available systems, and the location of the vessel relative to the location of the remote site. The vessel communications devices carried by the vessel can be determined by the typical boating practices of the user. That is, if the vessel is used only on inland waterways near inhabited regions, then cellular communications should be sufficient for providing a continuous communications link from the vessel to the shore.

Certain communications devices are connected to the bus 26 for interfacing with the main processor 12. Others are connected to the bus 31 and interface through the serial communication ports 30. In the embodiment where the bus 26 is a parallel data bus and the bus 31 is a serial data bus, it is preferable for the high-speed communications devices to interface with the main processor 12 over the bus 26. However, those skilled in the art recognize that serial communications devices can be adapted to interconnect with a parallel port, and vice versa. Thus the illustrated configuration and the segregation of communications devices into serial and parallel classes is merely exemplary.

A cellular/POTS modem 47 (plain old telephone system) provides access to a wired landline telephone system, a paging system, the Internet and a cellular telephone network. The cellular/POTS modem 47 further comprises a DSL (digital subscriber line) or a conventional telephone modem for providing Internet access by the main processor 12 to call up web pages and provide e-mail services for the vessel users. When the vessel is docked and connected to a telephone landline, the POTS modem is operative to provide the communications path to the remote site 46. A cable television system modem can also provide Internet access on the vessel via the cable system connection of the video subsystem 23.

While the vessel is at sea but within cellular telephone range, the cellular modem is operative to connect with a cellular base station to provide a communications link to the remote site 46, again providing Internet and email access, for example. In addition to providing vessel users with Internet access, the communications components can supply operational data and notifications to the remote site 46 over the Internet or via the most cost effective channel, as described below. Available communications systems for the integrated monitoring and control system 10 when the vessel is out of cellular telephone range are described below.

A wireless network interface 52 provides wireless communications aboard the vessel, for example, by forming a wireless local area network operated according to any of the know wireless standards. Communications devices aboard the vessel, such as laptop computers incorporating wireless network access devices, can communicate with each other and with the main processor 12 via the wireless local area network interface 52. Thus the vessel user can control the main processor 12 from her laptop computer and request information, such as operational data, for display on the laptop computer screen. Additionally, by establishing a communications link to shore (via the cellular/POTS modem as described above), or a satellite modem as described below the user can surf the Internet and access email accounts from her laptop computer.

Wireless personal digital assistants onboard the vessel communicate with the main processor 12 via a personal area network interface 54, or a wireless LAN. The known "Bluetooth" standard is one example of such a personal area network. Thus the user can communicate off-board from his personal digital assistant by accessing the personal area network interface 54 for sending and receiving signals off-vessel through the cell phone/POTS modem 47 or the satellite modem, for example.

Although wireless communications devices are described in conjunction with the integrated monitoring and control system 10 due to the mobility convenience they provide to users on the vessel, it is recognized that wire based schemes can also be employed aboard the vessel. Thus the user's laptop computer can be connected through a suitable wire interface to one of the buses of the integrated monitoring and control system 10.

A satellite modem 56 (e.g., a satellite phone), connected to the main processor 12 via the serial communication ports 30 and the bus 31, provides a link to various remote sites 46, including orbiting satellites for receiving entertainment programs and weather information, telephone service, and internet connectivity and for serving as a data port. Through the satellite modem 56 the user can access the Internet and other land-based communications systems while onboard the vessel and out of cellular telephone range. The main processor 12 can also communicate via the satellite modem 56 to receive commands and send vessel operational information and notifications to the user as described below.

An RF (radio frequency) modem 58 transmits and receives terrestrial signals including radio and television broadcasts. Like the satellite modem 56, the RF modem also provides access to the Internet and other land-based communications systems.

The audio transducers 28, as described above, are connected to the main processor 12 via the buses 26 and 31 and the serial communication ports 30. Alarm and audio alert signals generated by the main processor 12 are input to audio transducers 28, including audio speakers and other audio devices such as buzzers or horns situated at multiple locations on the vessel. The audio transducers 28 are also responsive to audio entertainment signals (as described further above) for reproducing audio programs throughout the vessel.

As will be discussed further below, the main processor 12 monitors vessel operational parameters and can be instructed to detect out of range parameters, perform statistical analysis on the collected parameters, store the data for later analysis, provide alarm signals, etc. For example, when one or more parameters fall outside of their permitted range, the main processor 12 provides an alarm signal to the remote site. The alarm specific nature of the alarm signal and the remote site for receiving the alarm signal depend on the operational status of the vessel and instructions provided by the vessel user to the main processor 12.

If the vessel is in operation, then onboard alarms provided by the audio transducers 28, and/or the display 12 and/or the distributed displays 18 are sufficient to alert the vessel users. Off-board data notification, as described below, will also be available, notwithstanding that the vessel is in operation. For example, when the owner permits another to use the vessel, the owner can track the vessel's course. However, the user may also request, by programming the main processor 12, that certain vessel conditions generate an alarm signal to a remote site 46, such as a Coast Guard station, for dispatching rescue assistance to the vessel. Other vessel alarm conditions can generate a signal to a vessel watch center, another example of a remote site 46, for arranging assistance when the vessel next arrives at its home dock. The signals can be provided as email messages to the remote sites 46 or generate audible alarms at the remote sites 46, depending on the nature of the alarm condition.

If the vessel is docked and unattended when the alarm condition arises, different alerts and notifications are provided. For example, the vessel user can be alerted by an email message to her home email address, a page to her beeper or a call to her cellular telephone or PDA (personal digital assistant). The vessel watch center is alerted by an email message or an FTP file transfer, in the latter case, detailed operational data is transmitted to the watch center for analysis of the condition.

The severity of the condition also affects the type of alarm that is generated. Serious conditions, such as a vessel fire, demand immediate attention and the alarm is thus sent to a fire station from which immediate assistance can be rendered. If the condition involves a bilge water level slightly in excess of a predetermined limit, then a notification of the condition, rather than an alarm, should be sufficient to allow investigation of the condition before the vessel suffers any damage. Such notifications can be sent as an email message to the user and/or the vessel watch center, for example.

Thus it can be seen that there are numerous possible alarm types and numerous recipients of these alarms, depending on the vessel condition that triggered the alarm and the operational status of the vessel. Less severe conditions generate notifications to those remote sites 46 that can render appropriate assistance or further analysis. The main processor 12 analyzes the vessel conditions, based on sensor inputs as described below, and determines the most appropriate communications system for sending the alarm, notification or message.

As can be seen from the above discussion and FIG. 1, there are multiple communications devices available to the main processor 12 for sending (and receiving) the notifications, alarms and messages to the appropriate remote site 46. For example, the main processor 12 provides the signal to the serial communication ports 30 for transmission to the remote site 46 via one or more of the illustrated communications components connected to the bus 31, e.g., the satellite modem 56 and the RF modem 58. Alternately or additionally, the main processor 12 provides the signal to one or more of the communications devices connected to the bus 26, e.g., the cell phone/POTS modem 47, the wireless network interface 52 and the personal area network interface 54 (the latter two for providing onboard alarms).

In addition to alarm signals received at a remote site 46, operational data can be transmitted to a remote site, on a predetermined schedule, for further analysis and identification of vessel operational conditions and predictive analysis of failure conditions.

In another embodiment focusing on vessel security, real-time images of the vessel and its surroundings are captured by the cameras of the video subsystem 22 and transmitted off-vessel, for example to the owner's home computer as an email attachment or uploaded to a web-site for downloading by the owner. Such images can be sent on a predetermined schedule, whenever an intruder is detected, or in response to an alarm condition. The cameras can be controlled remotely by the vessel user by issuing a command through one of the available communications systems to the main processor 12.

In yet another embodiment the RF modem 50 communicates bi-directionally with land-based services to provide information on the vessel's condition and to the alert the boat user to an emergency condition. The RF modem 50 transmits a high-frequency (HF) radio signal from the vessel to one or more land based antennas. As is known, such signals can propagate substantial distances due to signal skipping (i.e., reflecting) from the ionosphere and the surface of the earth. Thus the system can be employed while the boat is at sea and out of range of terrestrial line-of-sight receiving sites. One or more antennas in a network of terrestrial antennas receive the HF signal and forward the signal to a network control center. Although this embodiment is described with reference to an HF communications network, those skilled in the art recognize that other communications schemes can be used in lieu of the HF system.

Several alternative embodiments are contemplated for selecting the information transmitted from the vessel, for processing the information upon receipt at the remote site 46 and for conveying the information to the vessel user. For example, in one embodiment the information represents operational parameters for various vessel systems. Under control of the main processor 12, the information can be sent from the vessel over the HF link on a predetermined time schedule, when an emergency condition arises, or as the data changes during a reporting interval. In another embodiment the main processor 12 can analyze the data and determine the frequency with which the data is transmitted to the remote site 46.

If analysis of the information (performed by the main processor 12 or by the network control center at the receiving end) identifies or suggests an emergency condition aboard the vessel, an emergency message is transmitted to the vessel user. This message can be sent to the owner/operator's cellular telephone, beeper or pager, or sent via landline-based systems, such as the telephone system or the Internet in the form of a high-priority email. Less urgent notifications can be conveyed, for example, by posting the information to a web site accessible to the user or also by sending an email.

In one embodiment, the vessel owner/operator subscribes to a vessel watch service offered by a vessel service center. Vessel information transmitted from the vessel and received at the network control center is then transmitted to the vessel service center via an email or FTP message, or through another communications system. Also, to limit the data transmissions and the required bandwidth, in lieu of sending all received operational data, the network control center transmits only the data that has changed since the last update.

Notifications are sent by the service center to the vessel user as determined by the terms of a service contract and the nature of the required notification. Emergency vessel conditions invoke an immediate message to the vessel user, such as by pager or cellular telephone as set forth above.

In addition to providing alerts based on vessel operational conditions, unwanted intrusions onto the vessel can be detected by the one or more intrusion sensors 34 associated with the security and access control system 32. The intrusion information is transmitted from the vessel over the HF link to the network control center, and passed to the service center for generating an emergency notification to the operator. Security or police officials can be alerted by the service center and immediately dispatched to the vessel.

Since periodic vessel condition updates are expected at the vessel service center, the lack of a periodic update can also trigger an alert notification to the user, as this condition suggests the failure of one or more vessel systems.

The service center can also maintain a web site, accessible only to the user, for displaying all operational information collected from the vessel and updating the information on a predetermined time schedule. In yet another embodiment operational information is sent to the operator's email address once per day. More frequent updates (hourly for example) transmit only data changes from the last update.

Since the communications link from the vessel to land reports vessel conditions, the link should be highly reliable and continuously available. However, the link in the opposite direction is generally not intended to carry high-priority information and thus a less expensive communications channel can be employed for the land-to-vessel communications. For example, information transmissions to the vessel are carried over the sub-carrier authorization (SCA) channel of a frequency modulated (FM) radio signal. The SCA frequency, within the FM signal channel bandwidth, is modulated by the information to be transmitted and received by an onboard receiver designed to demodulate the SCA frequency. Since FM signals typically have a range of about 100 miles, the SCA technique is useable only when the vessel is within that range of an FM station transmitting antenna. For example, the user can remotely control an intrusion sensor 34, e.g., a camera, by transmittal of a command signal to the main processor 12 via an SCA signal. In one embodiment the SCA signal is periodically transmitted from a plurality of FM transmitters in the area of the vessel's home dock. In another embodiment, the vessel course is tracked and the FM transmitters along that course transmit the SCA signal to the vessel.

A navigation system 60 (including any one or more of the conventional navigation components, e.g., radar, global position system receiver, LORAN) communicates with and is controlled by the main processor 12 via the serial communication ports 30. In one embodiment, the navigation system 60 comprises a collision avoidance system that detects a potential collision and provides alarms, via the main processor 12, to the audio transducers 19, the primary display 16, the distributed displays 18, and the various illustrated communications of FIG. 1.

In one embodiment the navigation system 60 creates a virtual geofence surrounding the present position of the vessel, and provides an alarm when the main processor 12 determines that the vessel's position is outside the geofence. This feature is useful for detecting drift of a docked or anchored vessel. Additionally, the main processor 12 in conjunction with the navigation system 60 creates a moving geofence surrounding a projected vessel course, generating an alarm when the vessel moves outside the geofence.

A voice command system 62 accepts voice commands and in response, initiates main processor execution to implement the received voice command. The voice command system 62 is a convenient input device for all users, but is especially useful by handicapped users. The voice command system 62 and the main processor 12 can be programmed to recognize a plurality of voice commands providing an alternative to the system input devices 20.

Voice output notifications and emergency alerts are supplied to the audio transducers 28 for visually-impaired users. Hearing impaired users can rely on notification lights and displayed text notifications on the display 12 and the distributed displays 18. Physically handicapped individuals who cannot conveniently gain access to the input devices 20 use a personal digital assistant for communicating with the main processor 12, via the personal area network interface 54, for issuing vessel commands.

In response to commands received by the main processor from a remote site 46, (such as an email sent from the user's email program, received by the vessel via the cellular/POTS modem 47 and interpreted by the main processor 12) the vessel can be prepared in advance for the safety and comfort of the arriving the passengers. For example, a received command is processed by the main processor 12 to activate vessel lights and a heating, ventilating and air conditioning system (HVAC) 64. On a fishing excursion, a remote command activates a refrigerated ice maker to ensure that sufficient ice will be available for storing the day's catch. Alternatively, the main processor 12 can be programmed in advance to automatically prepare the HVAC and lighting systems 64 for departure or arrival on a user-determined schedule. As described above, the lighting system can also serve as a visible alarm indicator to those proximate or on the vessel. For example, under control of the main processor 12, the lights can be toggled to signal an alarm condition. Hearing-impaired individuals can also be warned of alert conditions via the blinking lights.

The integrated monitoring and control system 10 comprises monitoring and control functions for a plurality of vessel systems. In particular, monitoring and control is provided for the multiple essential vessel systems including the propulsion system, steering mechanisms, throttle control systems and course controller. These systems are illustrated collectively as vessel systems 70 in FIG. 1. The main processor 12 accepts analog or digital signals from sensors associated with the vessel systems 70, analyzes the received data, and controls associated vessel systems in response thereto by transmitting a signal to the vessel system to actuate one or more control components.

In one embodiment, a plurality of sensors associated with the vessel systems 70 are input to one of a plurality of sensor concentrators 72 (only two illustrated in FIG. 1) that in turn interface with the main processor 12 via the serial communication ports 30 and the buses 26 and 31. This embodiment of the present invention reduces vessel wiring, as several sensor signals are sent serially from the data concentrator 72 to the main processor 12, thus avoiding a wire link for each one of the multiple sensors distributed about the vessel.

In addition to receiving multiple sensor inputs and providing a single sensor data stream output, the data concentrator 72 can time tag and normalize the received sensor data and perform additional minimal pre-processing prior to transmission to the main processor 12. For example, in one embodiment the data concentrator calculates the sensed value in engineering units and transmits that value to the main processor 12. In another embodiment the data concentrator 72 transmits only changed parameter values to the main processor 12 and/or calculates statistical measures based on the sensed data. However, to minimize data concentrator cost, it is expected each would include minimal pre-processing and memory storage, relying instead on the main processor 12 to carry out the bulk of the data analysis processes and generate the necessary control signals in response thereto.

In another embodiment, in lieu of the sensor concentrators 72, the vessel sensors are connected to the main processor 12 via a two wire system that both delivers power to the sensor and serves as a communications path for the sensor. Such a two wire system, which reduces the required wiring compared with the tangle of conductors present on most prior art vessels, is available from ED&D of Oviedo, Fla.

Following is an exemplary list of the systems included within the vessel systems 70 for monitoring and control in accordance with the teachings of the present invention.

| | | | |
|---|---|---|---|
| | Engine Systems: | | |
| Water: | Raw Water Temperature | Oil: | Temperature |
| | Closed Cooling Temperature | | Pressure |
| | Closed Coolant Level | | |
| Transmission: | Fluid Temperature | Alternator: | Volts and Amps |
| | Fluid Pressure | | |
| | Fluid Level | | |
| Fuel: | Fuel Flow/Consumption | Exhaust: | Temperature |
| | | | Back Pressure |
| Engine: | RPM | | |
| | Hour Meter | | |
| | Generator Systems: | | |
| Water: | Raw Water Temp | Oil: | Temperature |
| | Closed Cooling Temp | | Pressure |
| | Closed Coolant Level | | |
| Fuel: | Fuel Flow/Consumption | Exhaust: | Temperature |
| | | | Back Pressure |
| Power Output: | Voltage | Generator: | RPM |
| | Amps | | Hour Meter |
| | Hertz | | |
| | Frequency | | |
| | Bilge Systems: | | |
| Fuel Tanks: | Fuel Level | Water Tanks: | Water Level |
| Waste Water Tank: | Water Level | Bilge Pumps: | Hour meter |
| | | | Sump water level |
| | | | Bilge water level |
| Bilge Conditions: | Temperature | A/C-D/C: | Converter Output |
| | Fuel fumes | | (Volts and Amps) |
| | Carbon Monoxide | | System Hours on/off |
| | Camera | | |
| DC System: | Battery Voltage | Thrusters/ | Unit Status |
| (on/off) | Battery Temperature | Stabilizers | Oil Level |
| Water Maker: | Unit Status (on/off) | Bonding System: | Status/effectiveness |
| Running Gear: | Rudder Position | | |
| | Trim Tab Position | | |
| | Running Angle | | |
| | Cabin Systems: | | |
| AC Shore Power: | Voltage | Air Conditioning: | Unit Status (on/off) |
| | Amps | | Cabin Temperature |
| | Hertz | | Output Air Temp |
| | Frequency | | Return Air Temp |
| | Reverse Polarity | | Water Pressure |
| Refrigerator: | Unit Status (on/off) | Security: | Cameras |
| | Refrigerator temperature | | Entry Door/Hatches |
| | Freezer Temperature | | Ice maker (on/off) |
| | Cockpit/Decks | | |
| | Swim Platform | | |
| | Cabin Systems: | | |
| Water System: | Unit Status (on/off) | Waste System: | Unit Status (on/off) |
| | Water Pressure | | Tank Level |
| | Water Usage | | |
| Cabin | Temperature | AC/DC Status (on/off) | |
| Condition: | Carbon Monoxide | Components: | Voltage output |
| | Smoke Detector | | Current output |

| Helm systems: | | |
|---|---|---|
| Ignitions: | Switch status (on/off) | Radar Collision Warning/Night Vision |
| | Time on/off | |
| Navigation Systems: | Water Depth | |
| | Water Temperature | |
| | Boat Speed | |
| | GPS/Loran | |
| | Radar | |
| | Auto-Pilot | |

Under control of the main processor 12 the measured operational parameters can be analyzed to determine when the vessel systems are due for maintenance. For example, engine maintenance can be scheduled after a predetermined number of operating hours or after traveling a predetermined number of nautical miles since the last scheduled maintenance. The main processor 12 tracks the elapsed time (and mileage) and provides an indication (typically a display indication) when engine maintenance is required. Other time, duration or mileage triggers can be programmed into the main processor 12 for providing a user indication when the trigger condition is satisfied. Additionally, the main processor 12 provides an odometer function, accumulating the elapsed operational time and/or number of nautical miles traveled. A global positioning system (GPS) receiver, a component of the navigation system 60, can be used to determine the mileage logged by the vessel. Alternatively, the vessel watch service center can determine preventive maintenance scheduling based on operational data received from the main processor 12 via one of the communications components of the integrated monitoring and control system 10.

Operating power is supplied to the integrated monitoring and control system 10 via a power conversion subsystem 88, responsive to dock/shore power or to vessel-generated power. The power conversion subsystem 88 is also one of the many vessel systems monitored and controlled by the system 10. When the supplied shore power or vessel power falls below a predetermined value an alarm or notification is generated and sent to the vessel user.

The integrated control and monitoring system 10 as illustrated in FIG. 1 is merely exemplary, as in various as-built embodiments the system 10 can include more or fewer components. Also, the system 10 is customizable to a particular vessel, class of vessels or in accordance with the user's requirements. As can be inferred from the various embodiments and examples set forth herein, the main processor 12, and thus the integrated monitoring and control system 10, can be programmed and controlled to provide various vessel functions, can communicate with remote sites through one or more communications components, and can communicate several different message types with the remote sites. All such embodiments and exemplary operational states are considered within the scope of the claims.

Figure 2:
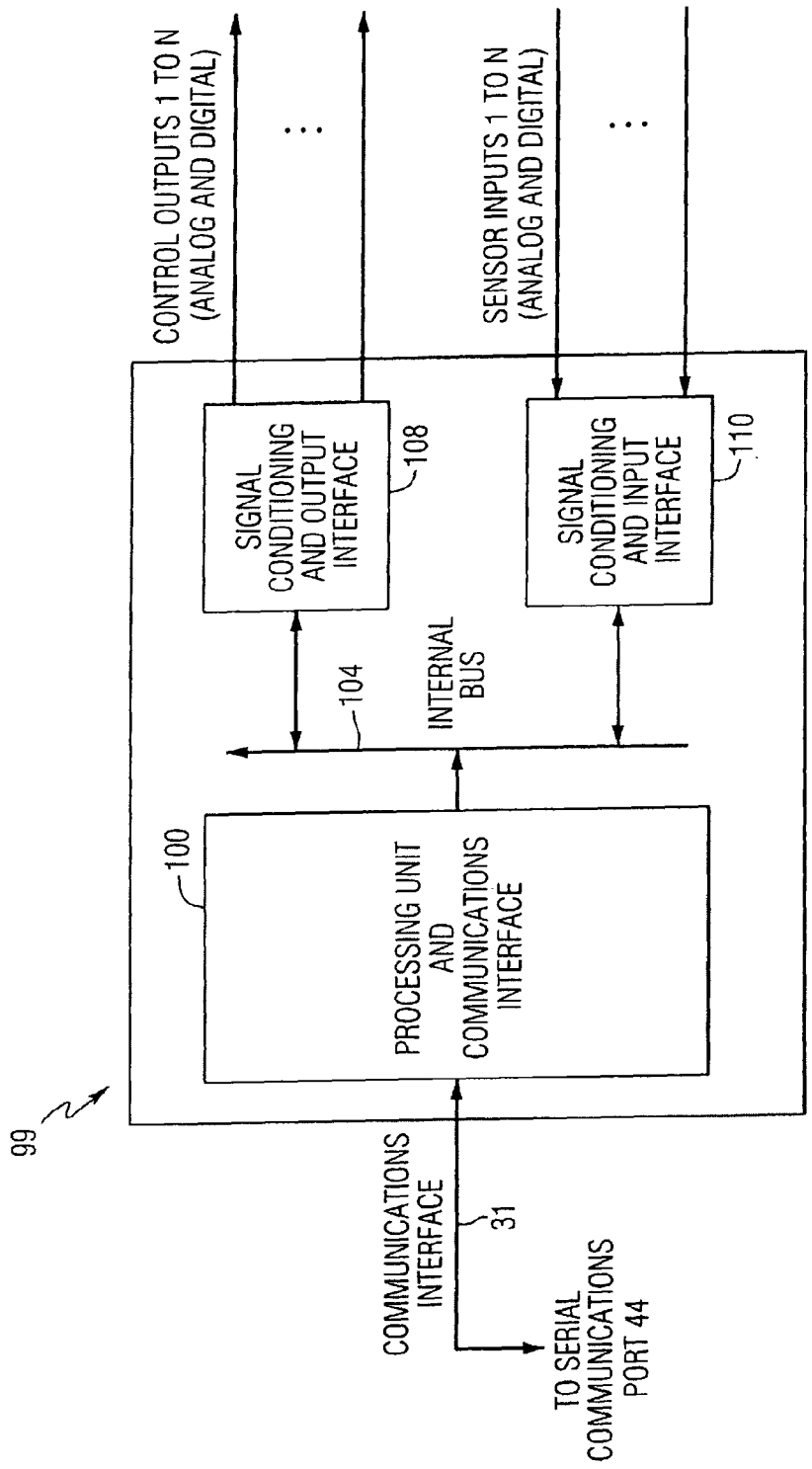
FIG. 2 is a block diagram of a sensor concentrator of the integrated monitoring and control system of FIG. 1.

A sensor concentrator 99 illustrated in FIG. 2 comprises a processing unit and communications interface 100 that communicates with the main processor 12 over the bus 31 to the serial communication ports 30. An internal bus 104 interconnects the processing unit and communications interface 100 with a signal conditioning and output interface 108 and a signal conditioning and input interface 110. The signal conditioning and output interface 108 provides a plurality of analog or digital output control signals, having the proper waveform, period, and amplitude, to effect control over various components and systems aboard the vessel, for example, to control the engine propulsion system. The use of such control signals to control vessel systems is known in the art. The signal conditioning and input interface 110 receives a plurality of analog or digital sensor inputs from the vessel systems and components, for analysis by elements of the integrated vessel monitoring and control system 10, and for generating control, notification, alarm, etc. signals based thereon.

Within the processing unit and communications interface 100, the sensor inputs are pre-processed, time tagged and serialized for input to the main processor 12 over the communications interface 102. Similarly, serialized received control signals are segregated in the processing unit and communications interface 100, forwarded to the signal conditioning and output interface 102 via the interface bus 104 and sent directly to the appropriate controlled device. In one embodiment, the serialized signals are sent over the serial bus in a time division multiple access scheme. Although not shown in FIGS. 1 and 2, power is supplied to each sensor concentrator from the available vessel power (e.g., 12 volts or 24 volts) or via a second bus, not shown.

It is recognized that vessel systems and components are supplied by many different manufacturers. It may, therefore, be necessary to customize one or more of the sensor concentrators 99 to interface with a particular system or component, in particular, customization of the signal conditioning and output interface 108 and the signal conditioning and input interface 110 may be required to provide the proper interface.

As can be seen from FIG. 1, the main processor 12 communicates with each of the FIG. 1 elements over a limited number of interfacing buses. This architecture limits the number of conductor runs required from the distributed vessel components and systems back to the main processor 12. Among the possible interface protocols are: IDE, Firewire, universal serial bus, Ethernet (including its various speed embodiments), PCI, PCIX, PCMCIA, VME, DVI, VGA, RS232, RS422, and RS485, Rapid IO, Fiber channel, serial ATA, and various known optical protocols. Those skilled in the art recognize that certain of the available interface protocols are better suited for communicating specific types of information between certain device types. The economical impact and available device types also influence the choice of buses and devices for the integrated monitoring and control system 10. For example, a VGA interface likely would be employed between the main processor 12 and the primary display 16. A Firewire or IDE protocol interface is more suitable for communicating between the main processor 12 and the data store 14. Thus, although the present invention teaches the advantageous use of serial type communication interfaces, the specific serial interface to be employed depends upon the interconnected devices and the types of signals to be carried over the interface.

An architecture and process have been described as useful for providing communications among components and systems on a vessel. While specific applications and embodiments of the invention have been illustrated, the principles disclosed herein provide a basis for practicing the invention in a variety of ways and in a variety of embodiments. Numerous variations are possible within the scope of the invention. The invention is limited only by the claims that follow.

What is claimed is:

1. A vessel monitoring system for monitoring systems on a vessel and for communicating system condition information from the vessel to a remote site, the vessel monitoring system comprising:
   sensors onboard the vessel, each sensor for monitoring one or more vessel systems and for providing system condition information in response thereto;
   a main processor for providing a first control signal to one or more vessel systems responsive to the system condition information, the main processor further responsive to a second control signal sent from the remote site, the first and second control signals for controlling the vessel systems;
   a first communications component aboard the vessel for communicating the system condition information to the remote site;
   wherein one of the vessel systems comprises a navigation system for creating a virtual geofence surrounding a present position of the vessel, and wherein the system condition information comprises an alarm when the vessel crosses the virtual geofence.

2. The vessel monitoring system of claim 1 further comprising:
   a second communications components onboard the vessel, the first and the second communications components each capable of communicating with the remote site according to a different communications methodology, the communications methodologies comprising a satellite modem, a radio frequency transmitter and receiver, a landline telephone, a landline telephone modem, a cellular telephone, a cellular telephone modem and a pager;
   a communications controller for selecting one of the first and the second communications components that can close a communications link with the remote site, wherein the system condition information is communicated to the remote site using the selected communications component.

3. The vessel monitoring system of claim 2 wherein when the system condition information identifies an emergency condition the communications controller selects one of the first and the second communications components for dispatching assistance to the vessel.

4. The vessel monitoring system of claim 2 wherein the communications controller selects one of the first and the second communications components based on one or more of a location of the vessel, the system condition information and a cost of available communications methodologies.

5. The vessel monitoring system of claim 1 the main processor for determining an incipient system fault.

6. The vessel monitoring system of claim 1 further comprising a plurality of displays at various location on the vessel for displaying the system condition information.

7. The vessel monitoring system of claim 1 further comprising a plurality of microphones at different locations on the vessel for use with a voice recognition system for controlling the vessel systems responsive to spoken commands.

8. The vessel monitoring system of claim 1 further comprising an onboard wired or wireless network for communicating the system condition information from the sensors to the main processor, from the main processor or from the sensors to displays distributed about the vessel and to other devices capable of receiving information via the onboard wired or wireless network.

9. The vessel monitoring system of claim 8 wherein the onboard wired or wireless network provides network connectivity to a portable computer for communicating with the main processor for controlling the vessel responsive to user-entered commands on the portable computer and for receiving the system condition information.

10. The vessel monitoring system of claim 8 the onboard wired or wireless network providing connectivity to an Internet site through the first communications component.

11. The vessel monitoring system of claim 8 wherein the wired or the wireless network comprises a wired local area network or a wireless Ethernet network.

12. The vessel monitoring system of claim 1 further comprising a black box for storing the system condition information, wherein the system condition information is overwritten by newer system condition information.

13. The vessel monitoring system of claim 1 wherein when the vessel is docked the landline telephone provides access from the vessel to the Internet and when the vessel is at sea the satellite modem, the terrestrial radio frequency transmitter and receiver and the cellular telephone modem provide access from the vessel to the Internet.

14. The vessel monitoring system of claim 1 wherein entertainment programs or weather information is supplied to the vessel and an entertainment program is distributed to speakers or displays distributed at different locations on the vessel.

15. The vessel monitoring system of claim 1 wherein the main processor controls one or more vessel systems to prepare the vessel for arrival of vessel passengers.

16. The vessel monitoring system of claim 1 wherein the virtual geofence continuously updates as the vessel follows a course.

17. The vessel monitoring system of claim 1 wherein a vessel user subscribes to a vessel monitoring service, the system condition information provided to a monitoring site and made available to the vessel user.

18. The vessel monitoring system of claim 1 wherein one of the sensors comprises a video camera, a still camera, a motion sensor or an infrared sensor.

19. The vessel monitoring system of claim 1 further comprising an access control system including a database of authorized user identification information, wherein one of a plurality of access control sensors is responsive to unique identification information, the access control system for determining whether a person seeking to board the vessel is an authorized vessel user responsive to the authorized user identification information and responsive thereto permitting vessel entry.

20. The vessel monitoring system of claim 1 wherein the remote site determines a maintenance action for the vessel system in response to the system condition information.

21. The vessel monitoring system of claim 1 further comprising a sensor concentrator for receiving and combining a plurality of sensor signals and providing a combined sensor signal to the communications controller.

22. The vessel monitoring system of claim 1 wherein the system condition information is provided to the remote site through one or more of a website or an email transmission.

23. The vessel monitoring system of claim 22 wherein contents of an email comprise operating information of one or more of the vessel systems as determined by one or more of the sensors.

24. The vessel monitoring system of claim 1 wherein the communications components comprises a sub-carrier authorization channel of an FM signal.

25. The vessel monitoring system of claim 1 wherein one of the sensors comprises a collision avoidance system for supplying an alarm to the remote site via the first communications component.

26. The vessel monitoring system of claim 1 further comprising a digital dashboard for displaying system condition information regarding the plurality of vessel operating systems on multiple displays at various locations on the vessel.

27. The vessel monitoring system of claim 1 further comprising an entertainment system responsive to a plurality of program sources for providing entertainment programming to vessel occupants.

28. The vessel monitoring system of claim 27 wherein the entertainment system comprises one or more of a video subsystem, an audio subsystem, a videodisc player, an antenna responsive to a terrestrial broadcast television signal, a satellite antenna responsive to a satellite television or a satellite radio signal, a still camera, a camcorder and a cable television signal.

29. The vessel monitoring system of claim 1 wherein a user determines operational condition thresholds, and wherein the first communications component communicates the system condition information to the remote site when one of the operational condition thresholds is exceeded.

30. The vessel monitoring system of claim 1 wherein a vessel location is tracked at the remote site and an alert is dispatched if the vessel enters an unauthorized region.

31. The vessel monitoring system of claim 1 wherein the sensors monitor engine systems, generator systems, bilge systems, cabin systems, helm systems and navigation systems.

\* \* \* \* \*